US009003075B2

(12) United States Patent
Sutou et al.

(10) Patent No.: US 9,003,075 B2
(45) Date of Patent: Apr. 7, 2015

(54) TRANSMISSION DEVICE AND TRANSMISSION METHOD

(71) Applicant: Fujitsu Limited, Kawasaki-shi, Kanagawa (JP)

(72) Inventors: Mitsuru Sutou, Sano (JP); Masayuki Tanaka, Ashikaga (JP); Yukio Suda, Shimotsuke (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/886,374

(22) Filed: May 3, 2013

(65) Prior Publication Data

US 2013/0332630 A1 Dec. 12, 2013

(30) Foreign Application Priority Data

Jun. 12, 2012 (JP) ................................. 2012-133186

(51) Int. Cl.
*G06F 3/00* (2006.01)
*G06F 11/30* (2006.01)

(52) U.S. Cl.
CPC ............. *G06F 11/3034* (2013.01); *Y02B 60/31* (2013.01)

(58) Field of Classification Search
CPC .. G06F 11/3034; G06F 11/3055; Y02B 60/31
See application file for complete search history.

(56) References Cited

U.S. PATENT DOCUMENTS

| | | | | |
|---|---|---|---|---|
| 5,249,271 A * | 9/1993 | Hopkinson et al. | ............. | 710/57 |
| 5,958,027 A * | 9/1999 | Gulick | ........................... | 710/300 |
| 6,202,164 B1 * | 3/2001 | Gulick | ........................... | 713/400 |
| 6,259,699 B1 * | 7/2001 | Opalka et al. | ................. | 370/398 |
| 6,603,831 B1 * | 8/2003 | Silveira | ......................... | 375/372 |
| 6,625,743 B1 * | 9/2003 | Gulick | ........................... | 713/400 |
| 7,006,510 B2 * | 2/2006 | Wei | ................................. | 370/412 |
| 7,876,785 B2 * | 1/2011 | Lautenschlaeger | ........... | 370/473 |
| 8,271,700 B1 * | 9/2012 | Annem et al. | ................... | 710/26 |
| 8,345,691 B2 * | 1/2013 | Lee et al. | .................... | 370/395.4 |
| 2006/0114912 A1 * | 6/2006 | Kwan et al. | ................. | 370/395.4 |
| 2006/0209684 A1 * | 9/2006 | Bei | ................................. | 370/229 |
| 2007/0280261 A1 * | 12/2007 | Szymanski | ................. | 370/395.4 |
| 2007/0280277 A1 * | 12/2007 | Lund | .............................. | 370/412 |
| 2011/0058564 A1 * | 3/2011 | Sugawara et al. | ............. | 370/401 |

FOREIGN PATENT DOCUMENTS

| | | |
|---|---|---|
| JP | 2001-144753 | 5/2001 |
| JP | 2007-74607 | 3/2007 |
| JP | 2011-61443 | 3/2011 |

OTHER PUBLICATIONS

"Universal Host Controller Interface (UHCI) Design Guide", Revision 1.1, Intel, Mar. 1996.*

* cited by examiner

*Primary Examiner* — Henry Tsai
*Assistant Examiner* — Jing-Yih Shyu
(74) *Attorney, Agent, or Firm* — Staas & Halsey LLP

(57) ABSTRACT

A transmission device includes a temporary storage unit that is provided for each port receiving input data, stores the data temporarily, and outputs the temporarily stored data in response to a read enable signal, a storage unit that performs time-division multiplexing on the data output from the temporary storage unit in response to the read enable signal and stores the data, a flow monitoring unit that monitors a data flow for each of the ports, and a control unit that selects a temporary storage unit that is a read enable target from the temporary storage units corresponding to the ports to which the data is input, by a weighted round robin system in accordance with the data flow for each of the ports, and outputs the read enable signal to the selected temporary storage unit.

8 Claims, 14 Drawing Sheets

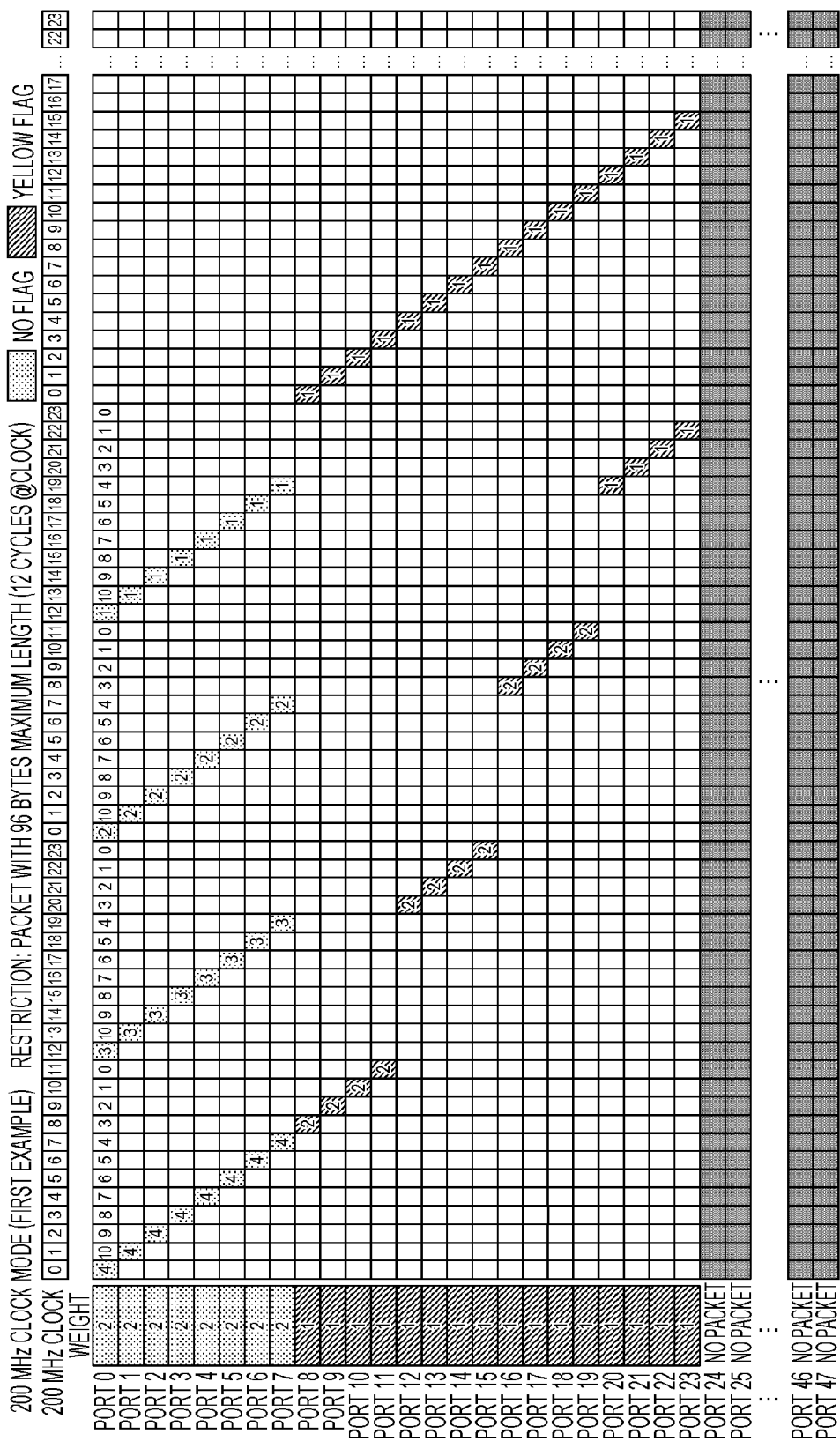

TRANSMISSION DEVICE AND TRANSMISSION METHOD

CROSS-REFERENCE TO RELATED APPLICATION

This application is based upon and claims the benefit of priority from the prior Japanese Patent Application No. 2012-133186 filed on Jun. 12, 2012, the entire contents of which are incorporated herein by reference.

FIELD

The embodiments discussed herein are related to a transmission device and a transmission method.

BACKGROUND

Currently, high-density and high-quality transmission devices are desired due to the spread of communication using the Internet. Thus, a transmission device is desired to have a function that supports a plurality of services such as Synchronous Optical Network/Synchronous Digital Hierarchy (SONET/SDH) and the Ethernet (registered trademark).

In addition, in a transmission device such as an L2 switch, an operation clock of a shared buffer processing unit is determined based on an assumption that packet signals input from a plurality of input ports are input at the full rate. In addition, in the transmission device, reduction of power consumption is desired.

However, in the above-described transmission device, an operation clock rate may be excessive when the input rate is low, because the operation clock is determined by assuming the input at the full rate. As a result, power consumption may increase owing to the excessive operation clock rate.

In addition, in the transmission device that supports the plurality of services such as SONET/SDH, an input port that is used for another service is not used out of the plurality of input ports. However, the operation clock is determined by assuming that all input ports are used. Therefore, even if there is an unused input port in the transmission device, a read enable signal is output to the unused input port in addition to the used ports and electric power is undesirably consumed.

Japanese Laid-open Patent Publication Nos. 2007-74607, 2001-144753, and 2011-61443 are examples of the related art.

SUMMARY

According to an aspect of the embodiments, a transmission device includes a temporary storage unit that is provided for each port receiving input data, stores the data temporarily, and outputs the temporarily stored data in response to a read enable signal, a storage unit that performs time-division multiplexing on the data output from the temporary storage unit in response to the read enable signal and stores the data, a flow monitoring unit that monitors a data flow for each of the ports, and a control unit that selects a temporary storage unit that is a read enable target from the temporary storage units corresponding to the ports to which the data is input, by a weighted round robin system in accordance with the data flow for each of the ports, and outputs the read enable signal to the selected temporary storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A and 7B are diagrams illustrating examples of selection operations of the conversion FIFO in a 200 MHz clock mode;

DESCRIPTION OF EMBODIMENTS

A transmission device and a transmission method according to the embodiments are described below in detail with reference to accompanying drawings. A technology discussed herein is not limited by the embodiments. In addition, in the embodiments that are described later, a case is described in which the transmission device is an L2 switch, and alternatively, any of an L1 switch to an L3 switch may be employed.

Embodiments

Figure 1:
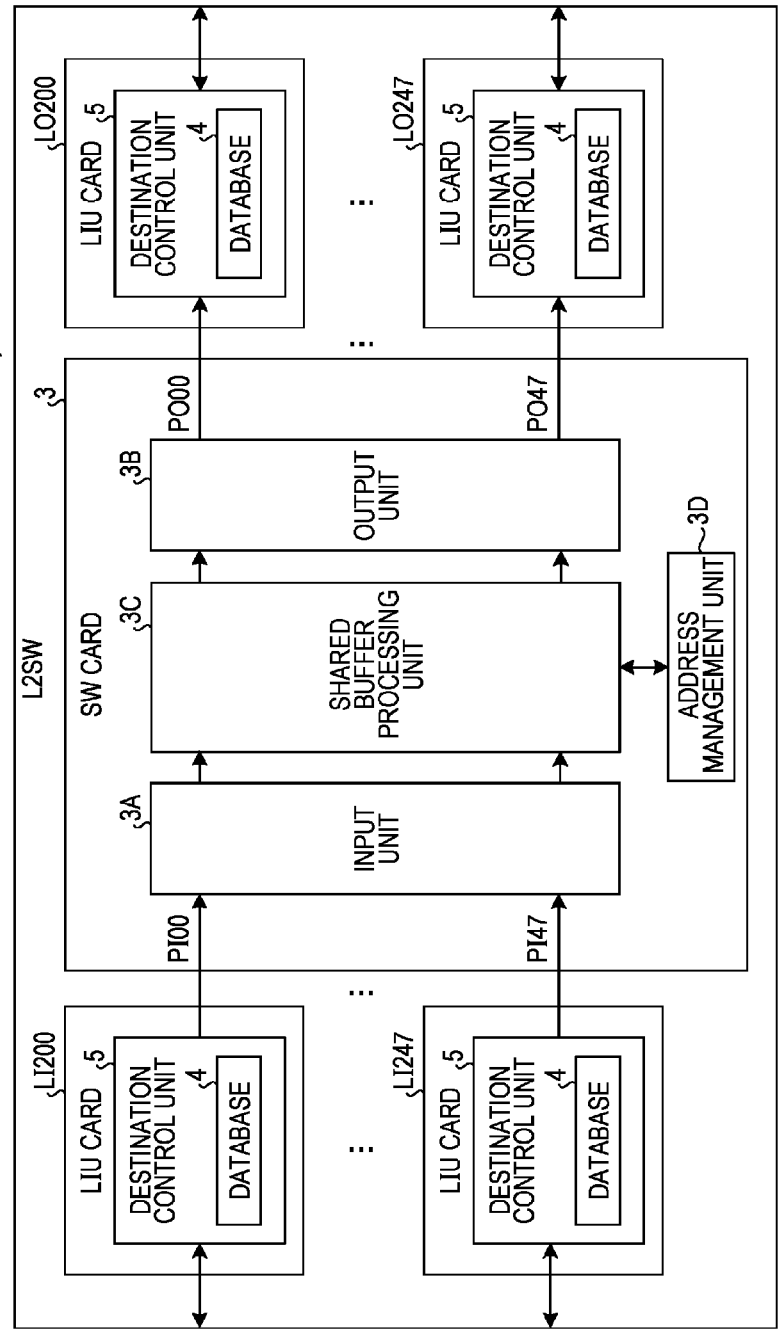
FIG. 1 is a diagram illustrating an example of an L2 switch according to an embodiment.

FIG. 1 is a diagram illustrating an example of the L2 switch according to an embodiment. The L2 switch 1 illustrated in FIG. 1 includes, for example, 48 line interface unit (LIU) cards LI200 to LI247, 48 LIU cards LO200 to LO247, and a switch card (hereinafter, simply referred to as a SW card) 3. The SW card 3 is connected to the LIU cards LI200 to LI247 through corresponding input ports PI00 to PI47. In addition, the SW card 3 is connected to the LIU cards LO200 to LO247 through corresponding output ports PO00 to PO47.

Each of the LIU cards LI200 to LI247 and LO200 to LO247 includes a destination control unit 5 having a database 4. The database 4 manages destination information such as card information and port information of a transfer destination that corresponds to a destination address in a frame which is input from a line. When the destination control unit 5 receives a frame from the line, the destination control unit 5 extracts a destination address in the frame and obtains destination information of a transfer destination that corresponds to the extracted destination address from the database 4. The destination control unit 5 in each of the LIU cards LI200 to LI247 adds the destination information to a header portion of an input signal IN. In addition, the destination control unit 5 outputs the input signal IN, to which the destination information is added, to the SW card 3 through the corresponding one of the input ports PI00 to PI47. The input signal IN is, for example, a packet of 32 bit width. A packet length of one packet is, for example, a 96 byte length at most. A processing cycle per packet is, for example, 12 cycles.

In addition, the SW card 3 packetizes the input signals IN00 to IN47 that are respectively received through the input ports PI00 to PI47, performs time-division multiplexing on the packets, and holds the packets in shared buffers that are described later. In addition, the SW card 3 restores packets that are held in the shared buffer as output signals OUT00 to OUT47 having the same format as that of the input signals IN00 to IN47. In addition, the SW card 3 outputs the restored output signals OUT00 to OUT47 to the output ports PO00 to PO47, respectively.

The SW card 3 includes an input unit 3A, an output unit 3B, a shared buffer processing unit 3C, and an address management unit 3D. The input unit 3A is an input interface that is connected to the LIU card LI200 to LI247 through the input ports PI00 to PI47, respectively. The input unit 3A temporarily stores the input signals IN00 to IN47 that are respectively input from the input ports PI00 to PI47 and converts a transmission clock of the input signal from an external clock to an internal clock. The input unit 3A operates with the external clock that is input from the outside for each line. In addition, the shared buffer processing unit 3C operates with the internal clock of 400 MHz, for example. As described later, the frequency of the internal clock may be changed to 400 MHz, 200 MHz, and 100 MHz as appropriate.

The output unit 3B is an output interface that is connected to the LIU cards LO200 to LO247 through the output ports PO00 to PO47, respectively. The output unit 3B temporarily stores the output signals OUT00 to OUT47 that are obtained by restoring packets (segments SG) on which switch processing is executed by the shared buffer processing unit 3C and converts the transmission clock of the output signal from the internal clock to the external clock.

The shared buffer processing unit 3C reads segments SG00 to SG47 that are obtained by converting pieces of data of the input signals IN00 to IN47 from the input unit 3A into pieces that are connected in series in units of 32, and holds the read segments SG in the corresponding shared buffers, respectively. In addition, the shared buffer processing unit 3C reads the segments SG that are held in the corresponding shared buffer, for each of the 48 output ports PO00 to PO47, restores the segments SG as the output signals OUT having the same format as that of the input signals IN, and outputs the restored output signals OUT to the output unit 3B.

The address management unit 3D manages write addresses WA and read addresses RA for each of the shared buffers in the shared buffer processing unit 3C.

When the destination control unit 5 in each of the LIU cards LO200 to LO247 receives the output signal OUT from the SW card 3, the destination control unit 5 deletes destination information that is added to the output signal OUT and outputs the output signal OUT from which the destination information has been deleted.

Figure 2:
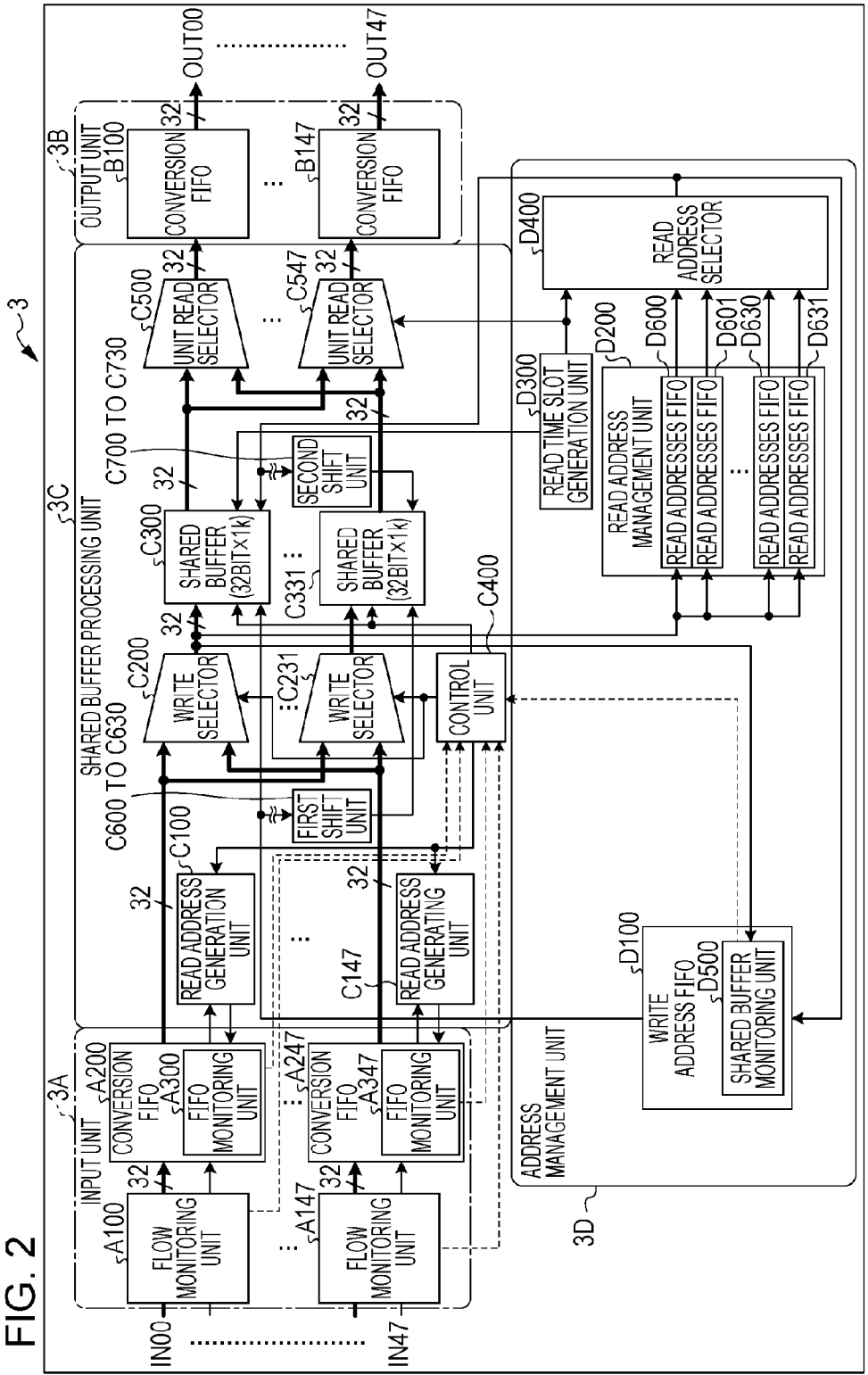
FIG. 2 is a diagram illustrating an example of an SW card.

FIG. 2 is a diagram illustrating an example of the SW card 3. The input unit 3A illustrated in FIG. 2 includes flow monitoring units A100 to A147 and conversion FIFO A200 to A247 as an example of a temporary storage unit. The conversion FIFO is a buffer that manages input and output of data in a first in first out (FIFO) system. The flow monitoring units A100 to A147 respectively monitor a data amount of a certain time period for the corresponding input ports PI00 to PI47. The certain time period is, for example, a time period that corresponds to 192 clock periods when the operation clock of 400 MHz is used.

Figure 3:
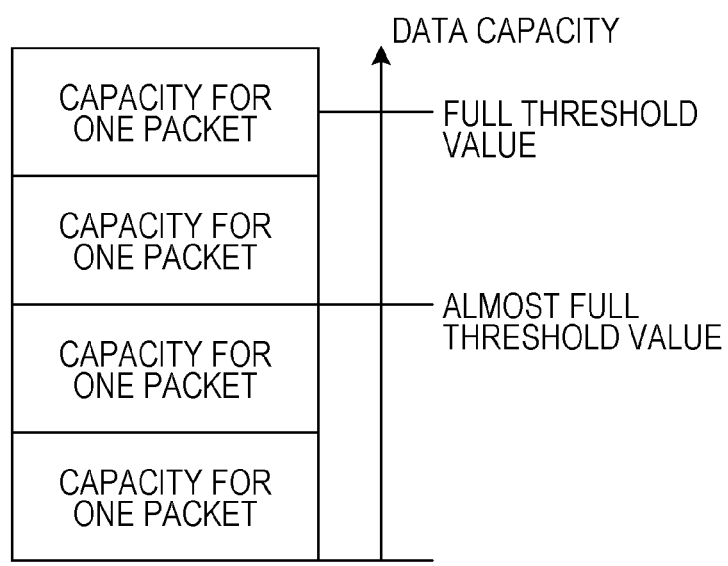
FIG. 3 is a diagram illustrating an example of a relationship of threshold values in FIFO monitoring units.

The conversion FIFO A200 to A247 include storage areas in which the input signals IN00 to IN47 that are respectively obtained through the corresponding input ports PI00 to PI47 are temporarily written. In addition, the conversion FIFO A200 to A247 respectively include FIFO monitoring units A300 to A347 as an example of a first monitoring unit. The FIFO monitoring units A300 to A347 respectively monitor a data capacity for the certain time period for the corresponding conversion FIFO A200 to A247. The certain time period is, for example, a time period that correspond to the 192 clock periods when the operation clock of 400 MHz is used. FIG. 3 is a diagram illustrating an example of a relationship of threshold values in the FIFO monitoring units A300 to A347. In the FIFO monitoring units A300 to A347, a state in which a data capacity for four packets is detected in the time period of the 192 clock periods is regarded as a state of full threshold value, and as illustrated in FIG. 3, a state in which a data capacity for ½ or more of the four packets, that is, two packets or more is detected in the time period of the 192 clock periods is regarded as a state of an almost full threshold value. When the input signals IN00 to IN47 are respectively written to the conversion FIFO A200 to A247 through the input ports PI00 to PI47, the conversion FIFO A200 to A247 output write completion pulses WP that indicate write completion to the shared buffer processing unit 3C.

The output unit 3B includes conversion FIFO B100 to B147. The conversion FIFO B100 to B147 store the output signals OUT00 to OUT47 and output the output signals OUT00 to OUT47 to the output ports PO00 to PO47, respectively.

The shared buffer processing unit 3C includes read address generation units C100 to C147, write selectors C200 to C231, shared buffers C300 to C331 as an example of a storage unit, a control unit C400, and read selectors C500 to C547. In addition, the shared buffer processing unit 3C includes first shift units C600 to C630 and second shift units C700 to C730.

The read address generation units C100 to C147 respectively receive the write completion pulses WP from the conversion FIFO A200 to A247 and generate read addresses RA when receiving write time slots TSW from the control unit C400. In addition, the read address generation units C100 to C147 respectively assign the read addresses RA to the conversion FIFO A200 to A247. The write time slots TSW correspond, for example, to 48 clocks for one cycle.

The shared buffers C300 to C331 are 32 buffers that correspond to the number of pieces of 32-bit data connected in series in the segments SG00 to SG47. The write selectors C200 to C231 are 48:1 selectors and select the segments SG00 to SG47 in accordance with the write time slots TSW. In addition, the write selectors C200 to C231 multiplex the segments SG00 to SG47 in units of the shared buffers C300 to C331 and respectively write the multiplexed segments SG00 to SG47 in the shared buffers C300 to C331.

The first shift units C600 to C630 shift phases of write addresses WA that are output from a write address FIFO that is described later in the address management unit 3D, in accordance with phases of the pieces of data that are output from the write selectors C200 to C231. In addition, the first shift units C600 to C630 assign the shifted write addresses WA to the shared buffers C300 to C331.

The second shift units C700 to C730 shift the phases of the read addresses RA that are output from a read address selector that is described later in the address management unit 3D correspondingly to the order of phase shift of the write addresses WA by the first shift units C600 to C630. In addition, the second shift units C700 to C730 assign the shifted read addresses RA to the corresponding shared buffers C300 to C331.

The read selectors C500 to C547 are 32:1 selectors and multiplex the pieces of data that are read from the shared buffers C300 to C331, in units of the output ports OUT00 to OUT47, in accordance with the read time slots TSR. The read time slots TSR correspond, for example, to 48 clocks for one cycle. In addition, the read selectors C500 to C547 respectively write the multiplexed pieces of data in the conversion FIFO B100 to B147.

The control unit C400 generates write time slots TSW. In addition, the control unit C400 monitors a data flow in units of the input ports PI00 to PI47 through the flow monitoring units A100 to A147, respectively. In addition, the control unit C400 monitors a data capacity in units of the input ports PI00 to PI47 through the FIFO monitoring units A300 to A347, respectively. In addition, the control unit C400 monitors data capacities of the shared buffers C300 to C331 through a shared buffer monitoring unit that is described later.

The address management unit 3D includes a write address FIFO D100, a read address management unit D200, a read time slot generation unit D300, and a read address selector D400. The write address FIFO D100 includes an area in which the write address WA in each of the shared buffers C300 to C331 is written. In addition, the write address FIFO D100 includes a shared buffer monitoring unit D500 as an example of a second monitoring unit. The shared buffer monitoring unit D500 monitors data capacities of the shared buffers C300 to C331.

The read address management unit D200 includes the read addresses FIFO D600 to D631 that respectively correspond to the shared buffers C300 to C331. The read addresses FIFO D600 to D631 are areas in which the read addresses RA of the shared buffers C300 to C331 are written, respectively. The read time slot generation unit D300 outputs read time slots TSR of read timing of each of the shared buffers C300 to C331. The read address selector D400 obtains a read address RA from one of the read addresses FIFO D600 to D631 in accordance with the read time slots TSR.

The control unit C400 in the shared buffer processing unit 3C may change setting of the internal clock of the shared buffers C300 to C331, for example, to any of three types of clocks such as 400 MHz, 200 MHz, and 100 MHz. The control unit C400 may change the setting of the internal clock on the basis of the monitoring results of the flow monitoring units A100 to A147, the FIFO monitoring units A300 to A347, and the shared buffer monitoring unit D500.

The flow monitoring units A100 to A147 output a yellow flag or a green flag to the control unit C400 in accordance with data flows of the corresponding input ports PI00 to PI47, respectively. The yellow flag is used to identify that a data flow of the input port PI is within ½ to ¼ of the full rate. The green flag is used to identify that a data flow of the input port PI is less than ¼ of the full rate. The control unit C400 determines that a data flow in the input port PI exceeds ½ of the full rate in a case of the input port PI having no flag. The full rate is the maximum input rate of each of the input ports PI. In addition, the control unit C400 determines that a data flow in the input port PI is within ½ to ¼ of the full rate in a case of the input port PI having the yellow flag. In addition, the control unit C400 determines that a data flow in the input port PI is less than ¼ of the full rate in a case of the input port PI having the green flag.

The control unit C400 generates a read enable signal for the conversion FIFO A200 to A247 using weighted round robin (WRR) when the segments SG00 to SG47 are written in the shared buffers C300 to C331. The weight that is used for WRR is set, for example, at "2" in the case of the input port PI having no flag, at "1" in the case of the input port PI having the yellow flag, and at "0" in the case of the input port PI having the green flag. The read enable signal is a signal to instruct the conversion FIFO A200 to A247 to read data when the segments SG00 to SG47 are written in the shared buffers C300 to C331.

In addition, the FIFO monitoring units A300 to A347 output a flag of the almost full threshold value to the control unit C400 when data capacities of the corresponding conversion FIFO A200 to A247 are in the state of the almost full threshold value or more. In addition, the shared buffer monitoring unit D500 outputs the flag of the almost full threshold value to the control unit C400 when data capacities of the shared buffers C300 to C331 are in the state of the almost full threshold value or more. In addition, the control unit C400 sets a 400 MHz clock mode when the flag of the almost full threshold value is detected.

Figure 5:
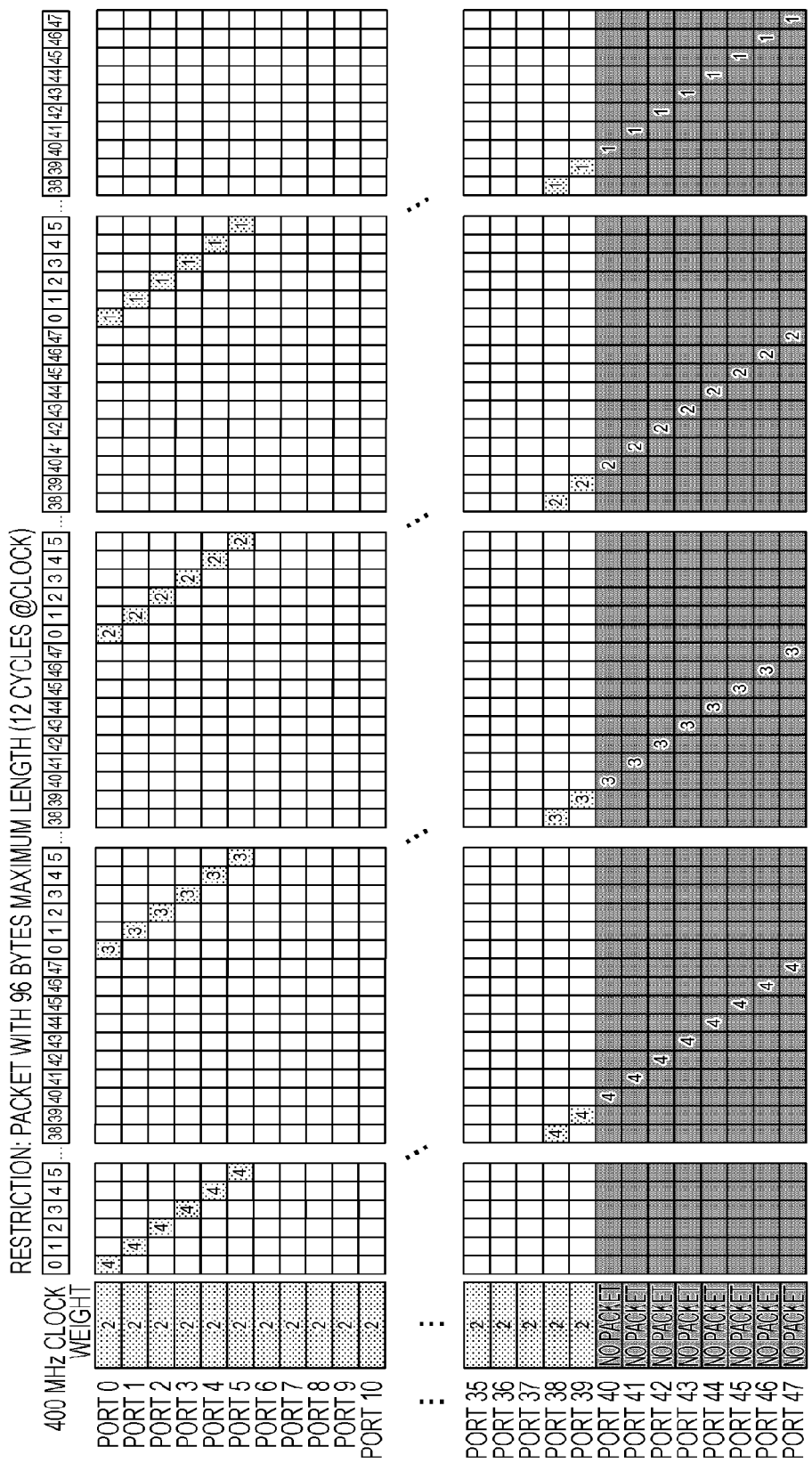
FIG. 5 is a diagram illustrating an example of a selection operation of a conversion FIFO in a comparative example.
Figure 6:
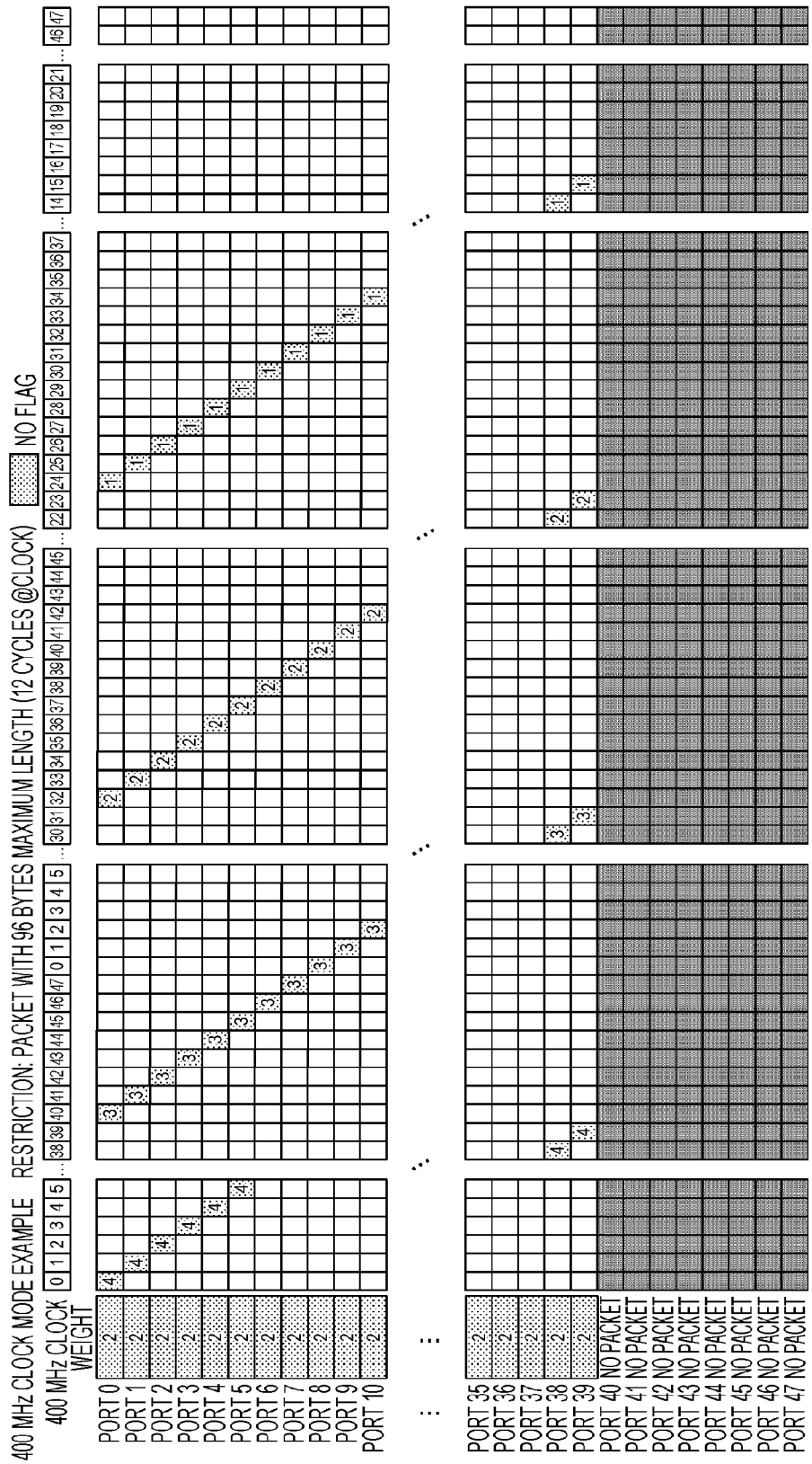
FIG. 6 is a diagram illustrating an example of a selection operation of the conversion FIFO in a 400 MHz clock mode.

The control unit C400 selects conversion FIFO of the input ports PI that are targets having no flag by round robin (RR) from the conversion FIFO A200 to A247 when the 400 MHz clock mode is set, and outputs the read enable signal to the selected conversion FIFO. An unused input port PI that does not include a packet is excluded from the target input ports PI. FIG. 5 is a diagram illustrating an example of an operation of selecting conversion FIFO according to a comparative example. FIG. 6 is a diagram illustrating an example of an operation of selecting conversion FIFO in the 400 MHz clock mode. In the comparative example of FIG. 5, a read enable signal is output to the conversion FIFO A200 to A247 of all of the input ports PI00 to PI47 including unused input ports PI40 to PI47 each of which does not include a packet. On the other hand, as illustrated in FIG. 6, according to the embodiment, among the input ports PI00 to PI47, the read enable signal is output to the conversion FIFO A200 to A239 of the input ports PI00 to PI39 that are targets except for the unused input ports PI40 to PI47 each of which does not include a packet.

That is, the control unit C400 outputs the read enable signal to each of the conversion FIFO A200 to A239 of the input ports PI00 to PI39 that are target except for the unused input ports PI40 to PI47 once the 48 times of one cycle by RR, as illustrated in FIG. 6. As a result, the read enable signal is not output to the unused conversion FIFO A240 to A247, so that the power consumption is reduced as compared with the example of FIG. 5.

Figure 7B:
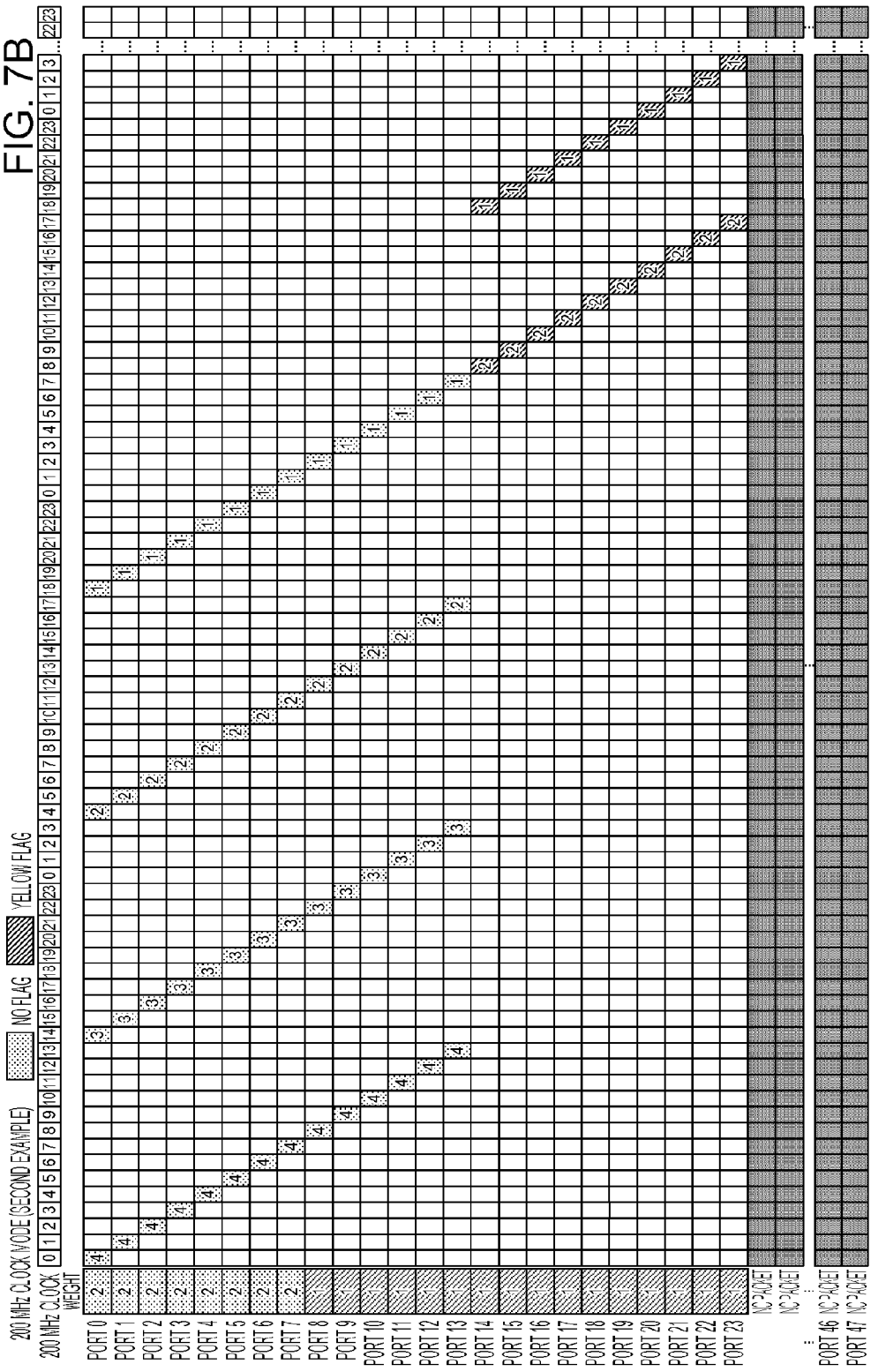

In addition, the control unit C400 selects by WRR the conversion FIFO A200 to A223 of the input ports PI00 to PI23 that are targets except for the unused input ports PI24 to PI47 each of which does not include a packet in a case of setting of a 200 MHz clock mode. FIGS. 7A and 7B are diagrams illustrating examples of operations of selecting conversion FIFO in the 200 MHz clock mode. In FIGS. 7A and 7B, the control unit C400 sets the internal clock at 200 MHz and selects the conversion FIFO A200 to A207 of the input ports PI00 to PI07 that are target having no flag by RR successively four times. In addition, the control unit C400 outputs the read enable signal to the selected conversion FIFO A200 to A207. In addition, the control unit C400 selects the conversion FIFO A208 to A223 of the input port PI08 to PI23 that are targets having the yellow flags by the RR successively twice. In addition, the control unit C400 outputs the read enable signal to the selected conversion FIFO A208 to A223. When one input port is read, the input port is read the second time at an interval of a packet length.

Figure 8:
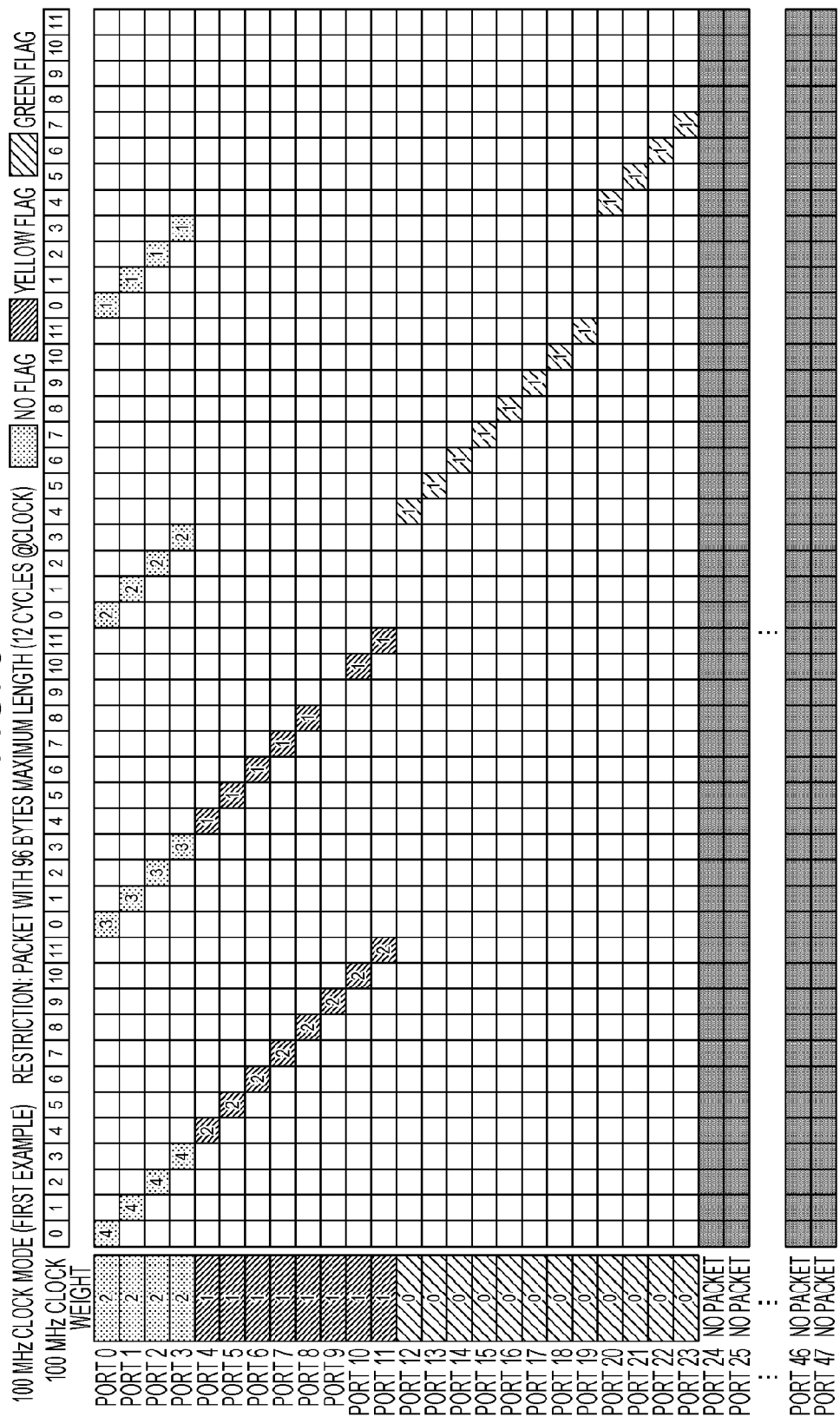
FIG. 8 is a diagram illustrating an example of a selection operation of the conversion FIFO in a 100 MHz clock mode.

In addition, the control unit C400 selects by WRR the conversion FIFO A200 to A223 of the input PI00 to PI23 that are targets except for the unused input ports PI24 to PI47 each of which does not include a packet in a case of setting of a 100 MHz clock mode. FIG. 8 is a diagram illustrating an example of an operation of selecting the conversion FIFO in the 100 MHz clock mode. In FIG. 8, the control unit C400 sets the internal clock at 100 MHz and selects by RR the conversion FIFO A200 to A2O3 of the input ports PI00 to PI03 that are targets having no flag successively four times. In addition, the control unit C400 outputs the read enable signal to the selected conversion FIFO A200 to A2O3. In addition, the control unit C400 selects by RR the conversion FIFO A204 to A211 of the input ports PI04 to PI11 that are targets having the yellow flags successively twice. In addition, the control unit C400 outputs the read enable signal to the selected conversion FIFO A204 to A211. In addition, the control unit C400 selects by RR the conversion FIFO A212 to A223 of the input ports PI12 to PI23 that are targets having the green flags once. In addition, the control unit C400 outputs the read enable signal to the selected conversion FIFO A212 to A223. When one input port is read, the input port is read the second time at an interval of a packet length.

Operations of the L2 switch 1 according to the embodiment are described below. First, an operation is described in which the SW card 3 writes data in the shared buffers C300 to C331 on an operation clock of 400 MHz.

The input unit 3A in the SW card 3 receives a write enable signal WE and the input signals IN00 to IN47 through the input ports PI00 to PI47, respectively. When receiving the write enable signal, the input unit 3A writes the input signals IN00 to IN47 in the conversion FIFO A200 to A247, respectively. In addition, when the input signals IN00 to IN47 are respectively written in the conversion FIFO A200 to A247, the conversion FIFO A200 to A247 output write completion pulses WP to the read address generation units C100 to C147, respectively.

When receiving the write completion pulses WP and receiving the write time slots TSW that are generated on the control unit C400 side, the read address generation units C100 to C147 respectively output read addresses RA to the conversion FIFO A200 to A247. When receiving the read addresses RA, the conversion FIFO A200 to A247 respectively read the segments SG00 to SG47 in the corresponding input signals IN00 to IN47, and respectively output the segments SG00 to SG47 to the write selectors C200 to C231. As a result, when the segments SG00 to SG47 are respectively read from the conversion FIFO A200 to A247, the operation clock is changed from the external clock to the internal clock.

Figure 4:
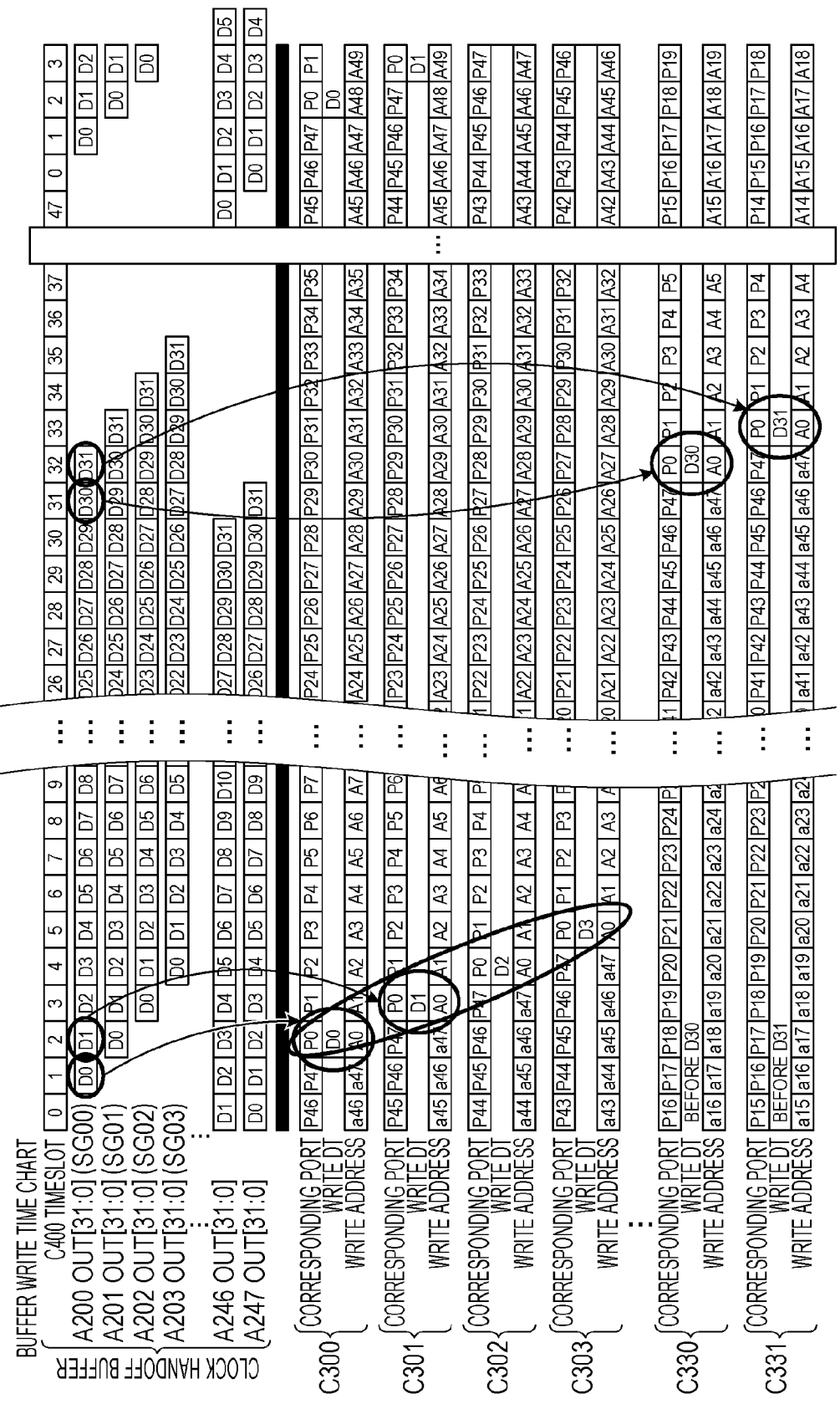
FIG. 4 is a diagram illustrating an example of a write operation to a shared buffer.

As illustrated in FIG. 4, the control unit C400 sequentially generates write time slots TSW "0" to "47" by one cycle. The read address generation units C100 to C147 generate read addresses RA after receiving the time slots TSW="0" to "47". In addition, the segments SG00 to SG47 are respectively read from the conversion FIFO A200 to A247 using the 32 time slots TSW until the time slots TSW indicate "1" to "47", and "0". In addition, the phases are shifted each other by one time slot.

In the segment SG00 that is written in the conversion FIFO A200, in the write time slot TSW "1", the write selector C200 writes data D0 in the segment SG00 from the conversion FIFO A200 to the shared buffer C300. In addition, in the time slot TSW "2", the write selector C201 writes data D1 in the segment SG00 from the conversion FIFO A200 to the shared buffer C301. In addition, the write selector C202 to C231 respectively select write data D2 to D31 in the segment SG00 from conversion FIFO A200 in order of "3" to "32" of the time slots TSW and respectively write the data D2 to D31 in the shared buffers C302 to C331. In this case, when receiving the leading data D0 in the segment SG00, the write selector C200 detects that the corresponding segment SG in the input ports PI00 to PI47 is newly received and outputs a write address request RQ to the write address FIFO D100. The write selector C200 extracts destination information DI that is added to the data D0 and assigns the extracted destination information DI to the read address management unit D200. The destination information DI is card information, port information, or the like of a transfer destination.

In the write address FIFO D100, a free write address of the shared buffer C300 is stored. In addition, each time the write address request RQ is received, the write address FIFO D100 sequentially generates the free write address as a write address WA and assigns the generated write address to the shared buffer C300. The write selectors C200 to C231 sequentially write the segments SG in write addresses WA in the shared buffer C300.

In addition, the write addresses WA that are output from the write address FIFO D100 are also assigned to the read address management unit D200 in the same phase as the destination information DI. In addition, the read address management unit D200 stores the write addresses WA in the read addresses FIFO D600 to D631 that correspond to each of the output ports PO00 to PO47 and that are related to the destination information DI.

In addition, when the write address WA that is output from the write address FIFO D100 is "A0", first, the write selector C200 writes the write address WA in the shared buffer C300 in the same phase (time slot TSW="2") as the data D0. As a result, first, the data D0 is written in the address "A0" of the shared buffer C300. The first shift units C600 to C630 sequentially shift the phases of the write addresses WA in accordance with the time slots TSW="3" to "33" that are next stage and subsequent stages. In addition, the write selectors C201 to C231 respectively write the write addresses WA in the shared buffers C301 to C331 in the same phase (time slot TSW="3" to "33") as the pieces of data D1 to D31. As a result, each of the pieces of data D1 to D31 is sequentially written in the address "A0" in each of the shared buffers C301 to C331.

In addition, when the time slots TSW indicate "2" to "33", the write selectors C200 to C231 respectively select the pieces of data D0 to D31 in the segment SG01 from the conversion FIFO A201. In addition, when the time slots TSW indicate "3" to "34", the write selectors C200 to C231 respectively select the pieces of data D0 to D31 in the segment SGO2 from the conversion FIFO A202. Similarly, when the time slots TSW indicate "0" to "31", the write selectors C200 to C231 respectively select the pieces of data D0 to D31 in the segment SG47 from the conversion FIFO A247. The pieces of data D0 to D31 are selected in accordance with the time slot TSW.

In addition, similar to the above-described example, the first shift units C600 to C630 shift the phases of the write addresses WA "A0" to "A47" that are output from the write address FIFO D100. The pieces of data D0 to D31 in the segments SG01 to SG47 are sequentially written to the addresses "A1" to "A47" that respectively correspond to the segments SG01 to SG47 in the shared buffers C300 to C331.

An operation is described below in which the SW card 3 reads pieces of data that are written in the shared buffers C300 to C331 on the clock operation of 400 MHz.

First, the read time slot generation unit D300 generates read time slots TSR. The read address selector D400 obtains a read address RA from one of the read addresses FIFO D600 to D631 in accordance with the read time slots TSR. In addition, the read address RA is assigned to the shared buffer C300. In addition, the read address selector D400 stores the obtained read address RA in the write address FIFO D100. As a result, the read address RA may be used as a subsequent free write address of the shared buffer C300.

Here, the read time slot generation unit D300 sequentially generates read time slots TSR "0" to "47" by one cycle. The read address selector D400 sequentially obtains the read addresses RA "A0" to "A47" from the read addresses FIFO D600 to D631 after generation of the read time slots TSR "1" to "47", and "0". In addition, the read address selector D400 assigns the sequentially obtained read addresses RA to the shared buffer C300. In this case, the second shift units C700 to C730 sequentially shift the phases of the read addresses RA "A0" to "A47" in accordance with each set of time slots TSR ("2" to "32"), ("3" to "33"), and ("1" to "31") of the next stage. In addition, the read address selector D400 assigns the read addresses RA to the shared buffers C300 to C331. As a result, the pieces of data D0 to D31 are read from the addresses "A0" to "A47" in the shared buffers C300 to C331 in a state in which the phases are shifted by one time slot in accordance with the write order that is described in the above write operation example.

An example is described in which the pieces of data D0 to D31 are read from the address "A0" in each of the shared buffers C300 to C331. In this case, when the time slots TSR are from "1" to "32", the read selector C500 sequentially writes the pieces of data D0 to D31 that correspond to the segment SG in the conversion FIFO B100. As a result, the output signal OUT00 having the same format as the input signal IN00 is output from the conversion FIFO B100 through the output port P000.

In addition, an example is described in which the pieces of data D0 to D31 are read from the addresses "A1" to "A47" in each of the shared buffers C300 to C331. In this case, when the time slots TSR are from "2" to "33", the read selectors C500 to C547 write the pieces of data D0 to D31 that correspond to the segment SG in the conversion FIFO B101. In addition, when the time slots TSR are from "3" to "34", the read selectors C500 to C547 write the pieces of data D0 to D31 that correspond to the segment SG in the conversion FIFO B102. In addition, when the time slots TSR are from "0" to "31", the read selectors C500 to C547 write the pieces of data D0 to D31 that correspond to the segment SG in the conversion FIFO B147. That is, the read selectors C500 to C547 sequentially select output destinations of pieces of data in accordance with the time slots TSR. As a result, the output signals OUT01 to OUT47 are respectively output through the output ports PO00 to PO47.

Figure 9:
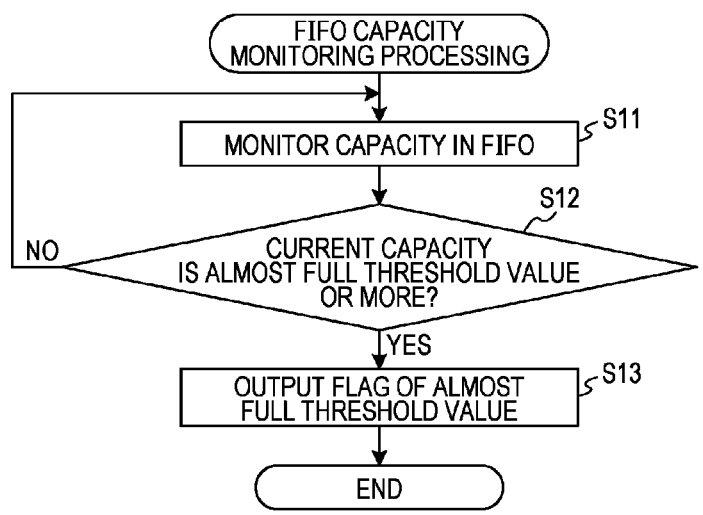
FIG. 9 is a flowchart illustrating an example of a processing operation of the FIFO monitoring unit that is related to FIFO capacity monitoring processing.

An operation is described below in which the internal clock is set depending on a data amount in the SW card 3. FIG. 9 is a flowchart illustrating an example of a processing operation of the FIFO monitoring units A300 to A347 that are related to FIFO capacity monitoring processing. The FIFO capacity monitoring processing illustrated in FIG. 9 is processing to monitor a data capacity in each of the conversion FIFO A200 to A247.

In FIG. 9, the FIFO monitoring units A300 to A347 respectively monitor current capacities in the conversion FIFO A200 to A247 (Step S11). The FIFO monitoring units A300 to A347 determine whether or not the current capacity is the almost full threshold value or more (Step S12). As illustrated in FIG. 3, the FIFO capacity becomes full, for example, with four packets in a time period that corresponds to 192 clocks with the internal clock of 400 MHz, and the FIFO capacity becomes in a state of almost full-capacity with two packets or more. Thus, the almost full threshold value corresponds, for example, to two packets or more.

When the current capacity is the almost full threshold value or more (Step S12: Yes), the FIFO monitoring units A300 to A347 output a flag of the almost full threshold value to the control unit C400 in the shared buffer processing unit 3C (Step S13), and cause the processing operation illustrated in FIG. 9 to end.

In addition, when the current capacity is not the almost full threshold value or more (Step S12: No), the FIFO monitoring units A300 to A347 cause the flow to proceed to Step S11 in order to monitor the current capacity.

When the current capacity is the almost full threshold value or more, the FIFO monitoring units A300 to A347 for the FIFO capacity monitoring processing output the flag of the almost full threshold value to the control unit C400. As a result, the control unit C400 may recognize whether or not the current capacity is the almost full threshold value or more for the conversion FIFO A200 to A247.

Figure 10:
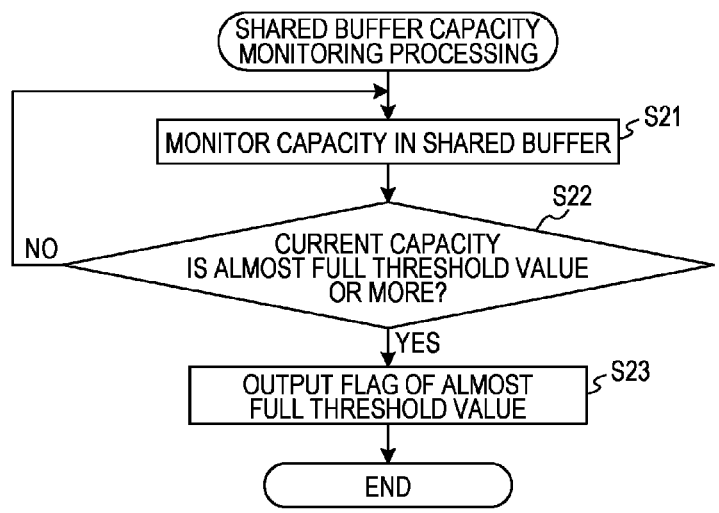
FIG. 10 is a flowchart illustrating an example of a processing operation of a shared buffer monitoring unit that is related to shared buffer capacity monitoring processing.

FIG. 10 is a flowchart illustrating an example of a processing operation of the shared buffer monitoring unit D500 that is related to shared buffer capacity monitoring processing. The shared buffer capacity monitoring processing illustrated in FIG. 10 is processing to monitor a data capacity in each of the shared buffers C300 to C331. In FIG. 10, the shared buffer monitoring unit D500 monitors the current capacity in the shared buffers C300 to C331 (Step S21). The shared buffer monitoring unit D500 determines whether or not the current capacity is the almost full threshold value or more (Step S22).

When the current capacity is the almost full threshold value or more (Step S22: Yes), the shared buffer monitoring unit D500 outputs the flag of the almost full threshold value to the control unit C400 in the shared buffer processing unit 3C (Step S23) and causes the processing operation illustrated in FIG. 10 to end.

In addition, when the current capacity is not the almost full threshold value or more (Step S22: No), the shared buffer monitoring unit D500 causes the flow to proceed to Step S21 in order to monitor the current capacity.

When the current capacity is the almost full threshold value or more, the shared buffer monitoring unit D500 for the shared buffer capacity monitoring processing outputs the flag of the almost full threshold value to the control unit C400. As a result, the control unit C400 may recognize whether or not the current capacity of the shared buffers C300 to C331 is the almost full threshold value or more.

Figure 11:
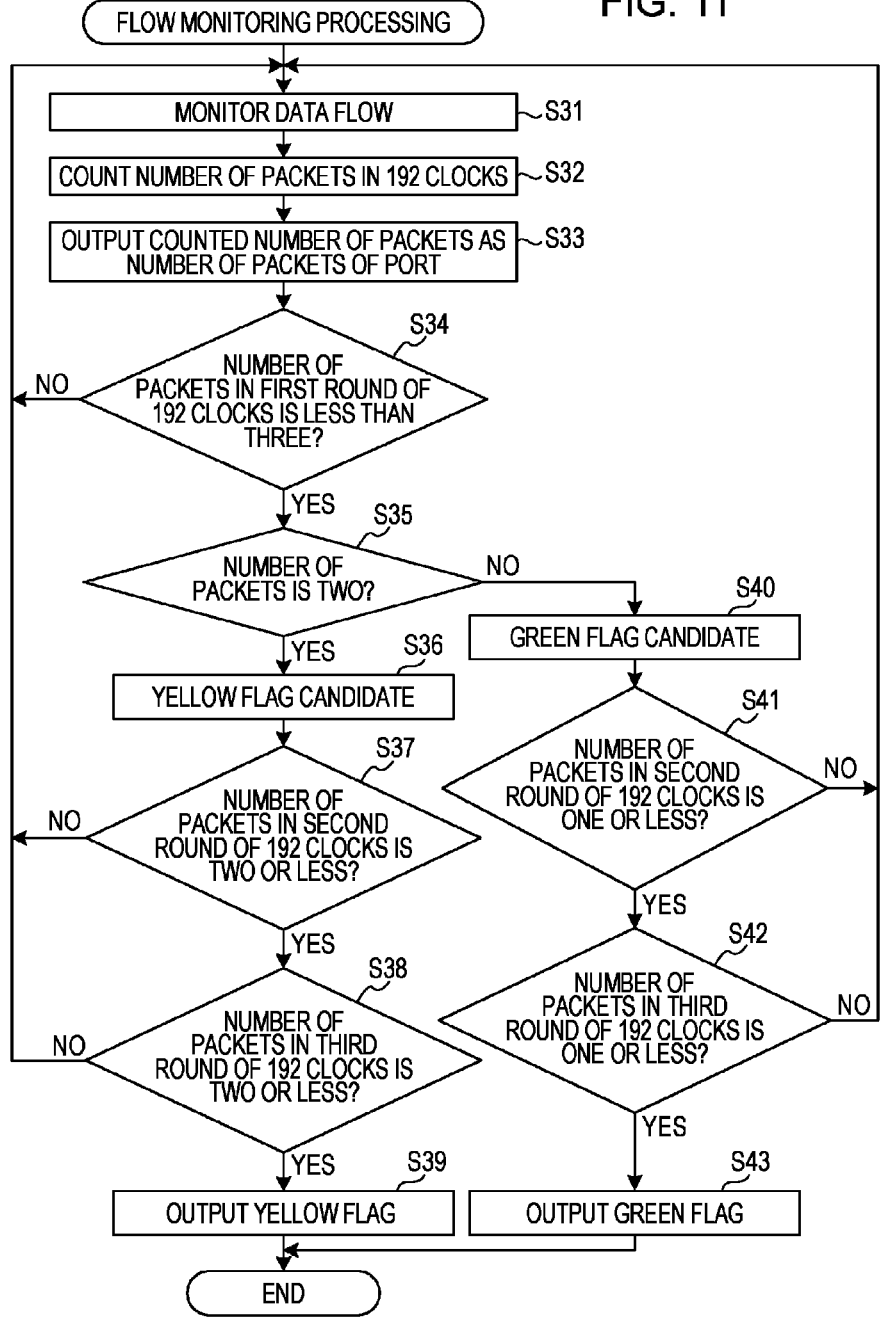
FIG. 11 is a flowchart illustrating an example of a processing operation of a flow monitoring unit that is related to flow monitoring processing.

FIG. 11 is a flowchart illustrating an example of a processing operation of the flow monitoring units A100 to A147 that are related to flow monitoring processing. The flow monitoring processing illustrated in FIG. 11 is processing to monitor a data flow of each of the input ports PI00 to PI47. The flow monitoring units A100 to A147 start up when the flag of the almost full threshold value is detected from the FIFO monitoring units A300 to A347 or the shared buffer monitoring unit D500. In FIG. 11, the flow monitoring units A100 to A147 respectively monitor data flows of the input ports PI00 to PI47 (Step S31) and count the number of packets in 192 clocks (Step S32). The 192 clocks are, for example, a time period that corresponds to 192 clocks of the clock of 400 MHz.

Each of the flow monitoring units A100 to A147 outputs the counted number of packets to the control unit C400 as the number of packets of the corresponding port PI (Step S33). The flow monitoring units A100 to A147 determine whether or not the number of packets in the first round of 192 clocks is less than three (Step S34). When the number of packets in the first round of 192 clocks is less than three (Step S34: Yes), the flow monitoring units A100 to A147 determine whether or not the number of packets is two (Step S35).

When the number of packets is two (Step S35: Yes), the corresponding one of the flow monitoring units A100 to A147 regards the port PI thereof as a yellow flag candidate (Step S36) and determines whether or not the number of packets in the second round of 192 clocks is two or less (Step S37).

When the number of packets in the second round of 192 clocks is two or less (Step S37: Yes), the flow monitoring units A100 to A147 determine whether or not the number of packets in the third round of 192 clocks is two or less (Step S38). When the number of packets in the third round of 192 clocks is two or less (Step S38: Yes), the flow monitoring units A100 to A147 output a yellow flag to the control unit C400 (Step S39) and cause the processing operation illustrated in FIG. 11 to end. The yellow flag indicates that a data flow of the input port PI is about ½ of the full rate.

In addition, when the number of packets in the first round of 192 clocks is not less than three (Step S34: No), the flow monitoring units A100 to A147 cause the flow to proceed to Step S31 in order to monitor the data flow. In addition, when the number of packets is not two (Step S35: No), the corresponding one of the flow monitoring units A100 to A147 regards the port PI thereof as a green flag candidate (Step S40). In addition, the flow monitoring units A100 to A147 determine whether or not the number of packets in the second round of 192 clocks is one or less (Step S41).

When the number of packets in the second round of 192 clocks is one or less (Step S41: Yes), the flow monitoring units A100 to A147 determine whether or not the number of packets in the third round of 192 clocks is one or less (Step S42). When the number of packets in the third round of 192 clocks is one or less (Step S42: Yes), the flow monitoring units A100 to A147 output a green flag to the control unit C400 (Step S43) and cause the processing operation illustrated in FIG. 11 to end. The green flag indicates that a data flow of the input port PI is about ¼ of the full rate.

In addition, when the number of packets is not one or less in the second round of 192 clocks (Step S41: No), the flow monitoring units A100 to A147 cause the flow to proceed to Step S31 in order to monitor the data flow. In addition, when the number of packets in the third round of 192 clocks is not one or less (Step S42: No), the flow monitoring units A100 to A147 cause the flow to proceed to Step S31 in order to monitor the data flow. Similarly, when the number of packets in the second round of 192 clocks is not two or less (Step S37: No), the flow monitoring units A100 to A147 cause the flow to proceed to Step S31 in order to monitor the data flow. When the number of packets in the third round of 192 clocks is not two or less (Step S38: No), the flow monitoring units A100 to A147 cause the flow to proceed to Step S31 in order to monitor the data flow.

The flow monitoring units A100 to A147 for the flow monitoring processing detect a data flow of the input ports PI in the first round of 192 clocks, in which the number of packets is two, and continuously detect data flows of the input ports PI in the second and third round of 192 clocks, in which the number of packets is two or less. In this case, the flow monitoring units A100 to A147 output the yellow flag to the control unit C400. As a result, the control unit C400 may determine that the data flow of the input ports PI is about ½ of the full rate in accordance with the yellow flag.

When a data flow in the input ports PI, in which the number of packets in the 192 clocks is one or less is continuously detected three times or more, the flow monitoring units A100 to A147 output a green flag to the control unit C400. As a result, the control unit C400 may determines that the data flow of the input ports PI is about ¼ of the full rate in accordance with the green flag.

In the flow monitoring processing, the number of protection stages when a yellow flag or a green flag is determined is set to three, however, the number of protection stages is not limited to three and may be changed as appropriate. For example, when the number of protection stages is set to two, response to the flag determination becomes fast. In addition, for example, when the number of protection stages is set to four or more, the response to the flag determination becomes slow, however, accuracy of the flag determination increases.

Figure 12:
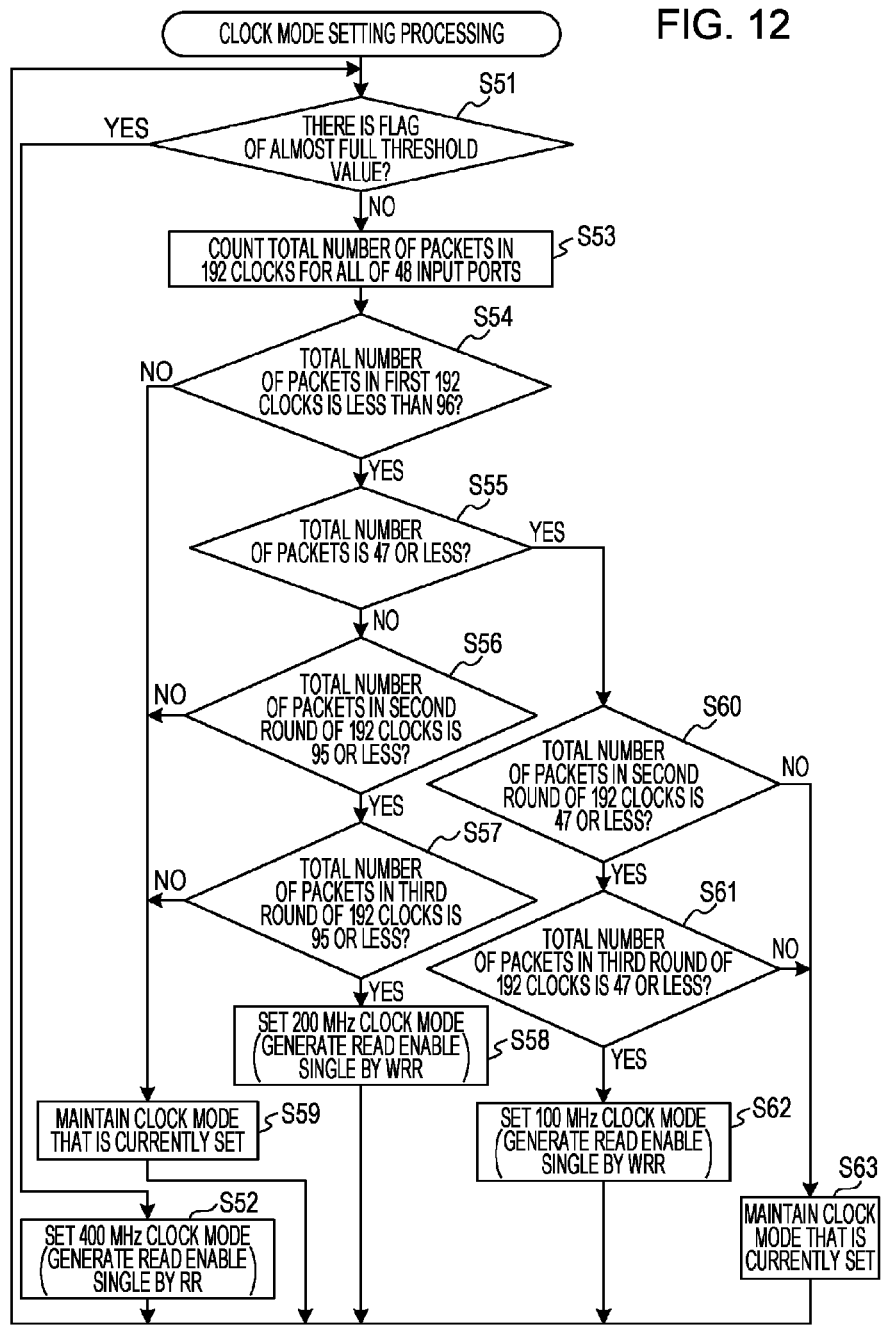
FIG. 12 is a flowchart illustrating an example of a processing operation of a control unit that is related to clock mode setting processing.

FIG. 12 is a flowchart illustrating an example of a processing operation of the control unit C400 that is related to clock mode setting processing. The clock mode setting processing illustrated in FIG. 12 is processing to change setting of the internal clock depending on a data amount of the SW card 3.

In FIG. 12, the control unit C400 determines whether or not there is a flag of the almost full threshold value (Step S51). When there is a flag of the almost full threshold value (Step S51: Yes), the control unit C400 sets the 400 MHz clock mode (Step S52) and causes the flow to proceed to Step S51 in order to determine whether or not there is a flag of the almost full threshold value. The control unit C400 sets the internal clock at 400 MHz in the case of the 400 MHz clock mode and selects a conversion FIFO A200 to A247 that corresponds to the input port PI that is a target in the 192 clocks by RR, as illustrated in FIG. 6. An unused input port PI that does not include a packet is not included in the target input ports PI. In addition, the control unit C400 outputs a read enable signal to the selected conversion FIFO A2.

When there is no flag of the almost full threshold value (Step S51: No), the control unit C400 counts the total number of packets in the 192 clocks of all of the input ports PI00 to PI47 (Step S53). The control unit C400 determines whether or not the total number of packets in the first round of 192 clocks is less than 96 (Step S54).

When the total number of packets is less than 96 (Step S54: Yes), the control unit C400 determines whether or not the total number of packets is 47 or less (Step S55). When the total number of packets is not 47 or less (Step S55: No), the control unit C400 determines whether or not the total number of packets in the second round of 192 clocks is 95 or less (Step S56). When the total number of packets in the second round of 192 clocks is 95 or less (Step S56: Yes), the control unit C400 determines whether or not the total number of packets in the third round of 192 clocks is 95 or less (Step S57).

When the total number of packets in the third round of 192 clocks is 95 or less (Step S57: Yes), the control unit C400 sets the 200 MHz clock mode (Step S58) and causes the flow to proceed to Step S51. The control unit C400 sets the internal clock at 200 MHz in the case of the 200 MHz clock mode and selects conversion FIFO A2 that corresponds to the input port PI that is a target in the 192 clocks by WRR, as illustrated in FIGS. 7A and 7B. An unused input port PI that does not include a packet is not included in the target input ports PI. In addition, the control unit C400 output a read enable signal to the selected conversion FIFO A2.

In addition, When the total number of packets is not less than 96 (Step S54: No), the control unit C400 maintains a clock mode that is currently set (Step S59), and causes the flow to proceed to Step S51.

In addition, when the total number of packets is 47 or less (Step S55: Yes), the control unit C400 determines whether or not the total number of packets in the second round of 192 clocks is 47 or less (Step S60). When the total number of packets in the second round of 192 clocks is 47 or less (Step S60: Yes), the control unit C400 determines whether or not the total number of packets in the third round of 192 clocks is 47 or less (Step S61).

When the total number of packets in the third round of 192 clocks is 47 or less (Step S61: Yes), the control unit C400 sets the 100 MHz clock mode (Step S62) and causes the flow to proceed to Step S51. In the case of 100 MHz clock mode, the control unit C400 sets the internal clock at 100 MHz and selects conversion FIFO A2 that corresponds to the input port PI that is a target in the 192 clocks by WRR as illustrated in FIG. 8. An unused input port PI that does not include a packet is not included in the target input ports PI. In addition, the control unit C400 outputs a read enable signal to the selected conversion FIFO A2.

When the total number of packets in the second round of 192 clocks is not 47 or less (Step S60: No), the control unit C400 maintains a clock mode that is currently set (Step S63) and causes the flow to proceed to Step S51. In addition, when the total number of packets in the third round of 192 clocks is not 47 or less (Step S61: No), the control unit C400 causes the flow to proceed to Step S63 in order to maintain the clock mode that is currently set. In addition, when the total number of packets in the second round of 192 clocks is not 95 or less (Step S56: No), the control unit C400 causes the flow to proceed to Step S59 in order to maintain the clock mode that is currently set. In addition, when the total number of packets in the third round of 192 clocks is not 95 or less (Step S57: No), the control unit C400 causes the flow to proceed to Step S59 in order to maintain the clock mode that is currently set.

When detecting the flag of the almost full threshold value, the control unit C400 for the clock mode setting processing sets the internal clock of 400 MHz. The control unit C400 selects conversion FIFO A2 that corresponds to the input port PI that is a target, when writing to the shared buffers C300 to C331 using the internal clock of 400 MHz. In addition, the control unit C400 outputs a read enable signal to the selected conversion FIFO A2 that corresponds to the input port PI that is a target.

When the total number of packets in the first round of 192 clock of all the input ports PI00 to PI47 is 96 to 48 and when the total number of packets in the second and third round of 192 clocks is 95 or less, the control unit C400 sets the internal clock of 200 MHz. The control unit C400 selects, by WRR, conversion FIFO A2 that corresponds to the input port PI having no flag and the input port PI having the yellow flag except for an unused input port that does not include a packet, when writing to the shared buffers C300 to C331 using the internal clock of 200 MHz. In addition, the control unit C400 outputs a read enable signal to the selected conversion FIFO A2 that corresponds to the input port PI that is a target.

When a case in which the total number of packets in the 192 clocks of all the input ports PI00 to PI47 is 47 or less occurs successively three times, the control unit C400 sets the internal clock of 100 MHz. The control unit C400 selects, by WRR, conversion FIFO A2 of the input port having no flag, the input port having the yellow flag, and the input port having the green flag except for an unused input port that does not include a packet, when writing to the shared buffers C300 to C331 using the internal clock of 100 MHz. In addition, the control unit C400 outputs a read enable signal to the selected conversion FIFO A2 that corresponds to the input port PI that is a target.

The control unit C400 sets, for example, the internal clock of 400 MHz when data flow rapidly increases during the operation of the internal clock of 200 MHz or 100 MHz, that is, low-speed clock and, for example, the flag of the almost full threshold value is detected. As a result, the control unit C400 may automatically change the setting to the internal clock of 400 MHz even during the operation of the internal clock of, for example, 200 MHz or 100 MHz. The control unit C400 changes the setting of the internal clock to 400 MHz, for example, when the data flow rapidly increases during the operation of the internal clock of 100 MHz. Alternatively, the internal clock may be set to 400 MHz, for example, through 200 MHz in stages, not directly to 400 MHz.

In the clock mode setting processing, the number of protection stages when the 200 MHz or 100 MHz clock mode is set is three, and alternatively, the number of protection stages may be changed as appropriate and not limited to the three stages. For example, when the number of protection stages is two, response to change in the setting of the clock mode becomes fast. In addition, for example, when the number of protection stages is four or more, the response to change in the setting of the clock mode becomes slow, however the determination accuracy increases.

In the embodiment, the operation is executed with the internal clock of 200 MHz or 100 MHz the speed of which is lower than usual when a data flow is small, so that dynamic power may be reduced.

In addition, in the embodiment, even when a data flow temporarily increases in one input port PI during the operation of the internal clock of 200 MHz or 100 MHz that is the low-speed clock, the low-speed internal clock operation may be maintained by selecting conversion FIFO A2 that corresponds to the input port PI that is a target by WRR. As a result, the total power consumption of chips may be reduced.

In the embodiment, even when congestion control occurs later in the L2 switch 1, for example, in the shared buffers C300 to C331, the shared buffer monitoring unit D500 monitors capacities of the shared buffers C300 to C331. As a result, the occurrence of packet loss may be reduced.

In the embodiment, when there is an unused input port PI that does not include a packet out of the plurality of input ports PI00 to PI47, conversion FIFO A2 that corresponds to the input port PI except for the unused input port PI is set as a target. As a result, output of a read enable signal to conversion FIFO A2 that correspond to the unused input port PI is avoided, so that the power consumption may be reduced.

In the control unit C400 according to the embodiment, the flow monitoring units A100 to A147 respectively monitor data of the input ports PI00 to PI47. In addition, the control unit C400 selects conversion FIFO A2 of a read enable target by WRR in accordance with a data flow for each of the input ports PI, from conversion FIFO A2 of the input ports through which data flows. In addition, the control unit C400 outputs a read enable signal to the selected conversion FIFO A2. As a result, the power consumption may be reduced.

The L2 switch 1 according to the embodiment includes the FIFO monitoring units A300 to A347 that respectively monitor data capacities of the conversion FIFO A200 to A247, and the shared buffer monitoring unit D500 that monitors data capacities of the shared buffers C300 to C331. In addition, when the monitoring results of the FIFO monitoring units A300 to A347 exceed the almost full threshold value or when the monitoring result of the shared buffer monitoring unit D500 exceeds the almost full threshold value, the control unit C400 sets the operation speed of the internal clock at 400 MHz.

In addition, when the monitoring results of the FIFO monitoring units A300 to A347 are less than the almost full threshold value or when the monitoring result of the shared buffer monitoring unit D500 is less than the almost full threshold value, the control unit C400 sets the operation speed of the internal clock at a low speed such as 200 MHz or 100 MHz. As a result, the operation speed of the internal clock is set at the low-speed, so that the power consumption may be reduced.

In addition, when the operation speed of the internal clock is the low-speed, the control unit C400 selects conversion FIFO A2 of a read enable target by WRR in accordance with a data flow for each of the input ports PI00 to PI47. As a result, the power consumption may be reduced while maintaining the internal clock at the low-speed.

In addition, when the operation speed of the internal clock is controlled at 400 MHz, the control unit C400 may select conversion FIFO A2 of a read enable target by RR.

In addition, the control unit C400 may weight WRR in accordance with a data flow for each of the input ports PI00 to PI47 and selects conversion FIFO A2 of a read enable target in descending order of the weight, for example, order of no flag, the yellow flag, and the green flag.

Figure 13:
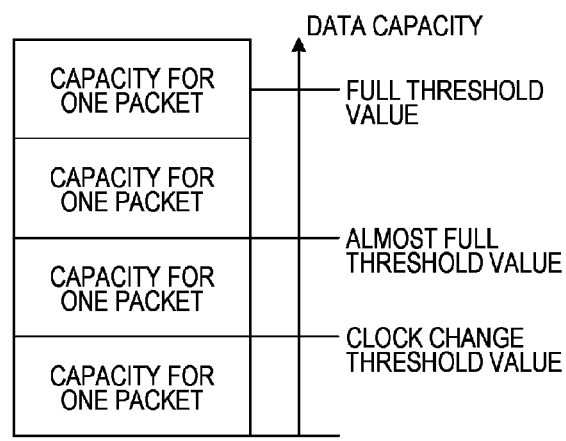
FIG. 13 is a diagram illustrating an example of a relationship of threshold values in the FIFO monitoring units according to another embodiment.

In the above-described embodiment, in the FIFO monitoring units A300 to A347, a data capacity for two packets is set as the almost full threshold value, and alternatively, as illustrated in FIG. 13, a data capacity for one packet may be set as a clock change threshold value. In this case, the FIFO monitoring units A300 to A347 may minutely set the clock control by gradually increasing an operation frequency of the internal clock. As a result, an operation time for the low-speed clock operation becomes long, so that the power consumption may be further reduced.

In addition, in the above-described embodiments, types of flag may be increased in addition to the yellow flag and the green flag, and types of clocks of low-speed may be increased by minutely monitoring a flow using the flow monitoring units A100 to A147 and by setting threshold values minutely. As a result, the clock control may be set minutely.

In addition, the configuration elements in each of the illustrated units may not be physically configured as illustrated in the accompanying drawings. That is, distribution and integration of the units are not specifically limited to the structure illustrated in accompanying drawings, and the units may be configured in given units by functionally or physically distributing and integrating all or a part of the units depending on various loads, a usage state, or the like.

In addition, all or a part of various processing functions that are executed in the units may be executed by a central processing unit (CPU), or a microcomputer such as a micro processing unit (MPU) or a micro controller unit (MCU). In addition, all or a part of the various processing functions may be executed on a program that is analyzed and executed by the CPU (or the microcomputer such as MPU or MCU) or on hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
   temporary storage units that are provided for each port receiving input data, store the data temporarily, and output the temporarily stored data in response to a read enable signal;
   a storage unit that performs time-division multiplexing on the data output from the temporary storage units in response to the read enable signal and stores the data;
   a flow monitoring unit that monitors a data flow for each of the ports; and
   a control unit that selects a temporary storage unit that is a read enable target from the temporary storage units corresponding to the ports to which the data is input, by a weighted round robin system in accordance with the data flow for each of the ports, and outputs the read enable signal to the selected temporary storage unit,
   wherein the control unit assiqns weight according to the weighted round robin system to the temporary storage unit that is the read enable target in accordance with a data flow for each of the ports and selects the temporary storage unit in descending order of the weight.

2. The transmission device according to claim 1, further comprising:
   a clock control unit by which an operation clock speed of the storage unit is changed depending on a sum of the data flows from the flow monitoring unit.

3. The transmission device according to claim 1, further comprising;
   a first monitoring unit that monitor a data capacity for each of the temporary storage units; and
   a second monitoring unit that monitors a data capacity of the storage unit, wherein
   the control unit controls an operation speed of an internal clock of the storage unit at a certain speed when a monitoring result of the first monitoring unit exceeds a first threshold value or when a monitoring result of the second monitoring unit exceeds a second threshold value, and controls the operation speed of the internal clock at a speed that is lower than the certain speed when the monitoring result of the first monitoring unit falls below, the first threshold value or when the monitoring result of the second monitoring unit fails below the Second threshold value.

4. The transmission device according to claim 3, wherein the first monitoring unit is provided for each of the temporary storage units.

5. A transmission device comprising:
   temporary storage units that are provided for each port receiving input data, store the data temporarily, and output the temporarily stored data in response to a read enable signal;
   a storage unit that performs time-division multiplexing on the data output from the temporary storage units in response to the read enable signal and stores the data;
   a flow monitoring unit that monitors a data flow for each of the ports; and
   a control unit that selects a temporary storage unit that is a read enable target from the temporary storage units corresponding to the ports to which the data is input, by a weighted round robin system in accordance with the data flow for each of the ports, and outputs the read enable signal to the selected temporary storage unit, wherein the control unit selects the temporary storage unit that is a read enable target by the weighted round robin system corresponding to the data flow for each of the ports when an operation speed of the internal clock is controlled at a low speed.

6. A transmission device comprising:

temporary storage units that are provided for each port, receiving input data, store the data temporarily, and output the temporarily stored data in response to a read enable signal;

a storage unit that performs time-division multiplexing on the data output from the temporary storage units in response to the read enable signal and stores the data;

a flow monitoring unit that monitors a data flow for each of the ports: and a control unit that selects a temporary storage unit that is a read enable target from the temporary storage units corresponding to the ports to which the data is input, by a weighted round robin system in accordance with the data flow for each of the ports, and outputs the read enable signal to the selected temporary storage unit, wherein the control unit selects the temporary storage unit that is a read enable target by a round robin system when an operation speed of the internal clock is controlled at a certain speed.

7. A transmission method of a transmission device that includes temporary storage units that are provided for each port receiving input data, store the data temporarily, and output the temporarily stored data in response to a read enable signal and a storage unit that performs time-division multiplexing on the data output from the temporary storage units in response to the read enable signal and stores the data, the transmission method causing the transmission device to execute a process comprising:

monitoring a data flow for each of the ports;

selecting a temporary storage unit that is a read enable target from the temporary storage units corresponding to the ports to which the data is input, by a weighted round robin system in accordance with the data flow for each of the ports;

outputting the read enable signal to the selected temporary storage unit, wherein a weight according to the weighted round robin system assigned to the temporary storage unit that is the read enable target in accordance with a data flow for each of the ports and the selecting selects the temporary storage unit in descending order of the weight.

8. The transmission method according to claim 7, wherein the process further includes changing an operation clock speed of the storage unit in accordance with a sum of the data flows.

* * * * *

UNITED STATES PATENT AND TRADEMARK OFFICE
CERTIFICATE OF CORRECTION

PATENT NO.         : 9,003,075 B2                                    Page 1 of 1
APPLICATION NO.    : 13/886374
DATED              : April 7, 2015
INVENTOR(S)        : Mitsuru Sutou et al.

It is certified that error appears in the above-identified patent and that said Letters Patent is hereby corrected as shown below:

In the Claims

Column 16, Line 21, In Claim 1, delete "assiqns" and insert -- assigns a --, therefor.
Column 16, Line 32, In Claim 3, delete "comprising;" and insert -- comprising: --, therefor.
Column 16, Line 44, In Claim 3, delete "below," and insert -- below --, therefor.
Column 16, Line 46, In Claim 3, delete "fails" and insert -- falls --, therefor.
Column 16, Line 46, In Claim 3, delete "Second" and insert -- second --, therefor.
Column 17, Line 7, In Claim 6, delete "port," and insert -- port --, therefor.
Column 17, Line 15, In Claim 6, delete "ports: and" and insert -- ports; and --, therefor.
Column 18, Line 19, In Claim 7, after "system" insert -- is --.

Signed and Sealed this
Eighteenth Day of August, 2015

Michelle K. Lee
*Director of the United States Patent and Trademark Office*